(12) United States Patent
Sampson et al.

(10) Patent No.: US 11,737,433 B2
(45) Date of Patent: Aug. 29, 2023

(54) AQUATIC CAGE ROTATION DEVICE

(71) Applicant: UNIVERSITY OF PRINCE EDWARD ISLAND, Charlottetown (CA)

(72) Inventors: Jordan Sampson, North Rustico (CA); Brett McDermott, Kensington (CA); Dylan Macisaac, Kensington (CA)

(73) Assignee: UNIVERSITY OF PRINCE EDWARD ISLAND, Charlottetown (CA)

(*) Notice: Subject to any disclaimer, the term of this patent is extended or adjusted under 35 U.S.C. 154(b) by 607 days.

(21) Appl. No.: 16/643,952

(22) PCT Filed: Sep. 5, 2018

(86) PCT No.: PCT/CA2018/051067
§ 371 (c)(1),
(2) Date: Mar. 3, 2020

(87) PCT Pub. No.: WO2019/046935
PCT Pub. Date: Mar. 14, 2019

(65) Prior Publication Data
US 2021/0000084 A1    Jan. 7, 2021

Related U.S. Application Data

(60) Provisional application No. 62/554,187, filed on Sep. 5, 2017.

(51) Int. Cl.
*A01K 61/54*    (2017.01)
(52) U.S. Cl.
CPC .................... *A01K 61/54* (2017.01)

(58) Field of Classification Search
CPC ........ A01K 61/54; A01K 61/50; A01K 61/60; B65G 47/248
(Continued)

(56) References Cited

U.S. PATENT DOCUMENTS 3,797,624 A * 3/1974 Powell ................. B65G 11/183
193/38
4,458,801 A * 7/1984 Nichols ................ B65G 11/063
221/172
(Continued)

FOREIGN PATENT DOCUMENTS

EP    0681783 A1    11/1995
FR    2900027 A1    10/2007

OTHER PUBLICATIONS

International Search Report & Written Opinion dated Nov. 22, 2018 for PCT/CA2018/051067.

*Primary Examiner* — Tien Q Dinh
*Assistant Examiner* — William L Gmoser
(74) *Attorney, Agent, or Firm* — Schmeiser, Olsen & Watts, LLP

(57) ABSTRACT

Provided is a device for flipping or rotating a floating aquatic cage to mitigate biofouling, and for farm management, such as to carry out maintenance and facilitate harvesting, particularly the style of floating cage used in farming oysters and other shellfish. The device includes a hollow frame or housing which defines a path through which the floating aquatic cage may pass, including entrance and exit openings; and one or more guide elements positioned on an inside surface of the hollow frame or housing. The one or more guide elements form an obstruction to opposing corners of the floating aquatic cage, and impart a turning force in such a manner as to rotate the floating aquatic cage.

30 Claims, 12 Drawing Sheets

(58) Field of Classification Search
USPC .......................................................... 198/417
See application file for complete search history.

(56) References Cited

U.S. PATENT DOCUMENTS

| | | | | |
|---|---|---|---|---|
| 4,492,299 | A | * | 1/1985 | McLeod .............. B65G 47/248 198/417 |
| 4,704,990 | A | | 11/1987 | Moxham |
| 5,438,958 | A | | 8/1995 | Ericsson |
| 5,609,237 | A | * | 3/1997 | Lenhart ................ B65G 47/248 198/417 |
| 5,957,264 | A | * | 9/1999 | Carey ........................ B08B 9/42 198/417 |
| 6,073,749 | A | * | 6/2000 | Biondi ................. B65G 47/248 198/408 |
| 6,116,401 | A | * | 9/2000 | Carleton .............. B65G 11/063 193/46 |
| 6,860,800 | B1 | * | 3/2005 | Maurer ................ B65G 47/248 451/364 |
| 2011/0265730 | A1 | | 11/2011 | Farrington |
| 2018/0213752 | A1 | | 8/2018 | Goudey |

\* cited by examiner

AQUATIC CAGE ROTATION DEVICE

CROSS-REFERENCE TO RELATED APPLICATIONS

This application claims priority to PCT Application No. PCT/CA2018/051067, having a filing date of Sep. 5, 2018, based off of U.S. Provisional Application No. 62/554,187 having a filing date of Sep. 5, 2017, the entire contents both of which are hereby incorporated by reference.

FIELD OF TECHNOLOGY

The following relates to devices and methods for flipping or rotating a floating aquatic cage to mitigate biofouling and for farm management, such as to carry out maintenance and facilitate harvesting, particularly with the style of floating cage used in farming oysters and other shellfish.

BACKGROUND

Oyster farming is carried out using a variety of methods. In Eastern Canada, the Canadian west coast and northeastern regions of the United States, a suspended culture technique is used in which oysters are held inside floating cages. An example of this system is shown in FIGS. 1 (A) and (B), which illustrates a typical floating cage (1) having floatation (2a,2b), with the cages tethered in series such that each cage (1) is connected via tether lines (3a,3b) to a main line (4) which is anchored to the ocean floor.

In winter, the cages are lowered to the bottom where they are protected from the ice. In the example shown in FIGS. 1 (A) and (B), the flotation (2a,2b) includes pontoons with reservoir caps that screw on, and which are removed to allow the pontoons to fill with water and sink to the bottom. Primarily, however, the cages are kept suspended at the surface in a relatively warm and phytoplankton-abundant environment, which enhances shell growth and shortens the production cycle. However, marine life constantly accumulates on objects floating in a marine environment, and as such the cages must be constantly tended to avoid biofouling.

There are many different types of marine life which can cause bio-fouling, from microscopic bacteria to larger plants, crustaceans and mollusks, such as seaweed, barnacles and mussels. If bio-fouling is allowed to persist and grow, the oysters must compete with the other plant and animal life for resources which can cause a reduction in growth rate, prolonged growing times and longer wait times to harvest. Bio-fouling can also affect the shape and size of the oysters, and generally reduce product quality and profit margins for the oyster farmers. Antifouling is therefore a key part of oyster farming as it yields a higher volume, better shaped and larger product, thereby increasing market value.

To address the need for antifouling and to carry out regular maintenance, systems have been developed which allow for the cages to be flipped and be either submerged in, or float on top of the water. Antifouling occurs once the cages are flipped out of the water to dry. The cage flipping is a critical step in the oyster farming process, yet can be an arduous task.

After a period of time, typically around ten days, the oyster farmer must flip the cages, a process that allows sunlight and air to kill any bacteria that may have formed on the oysters. This is typically done by hand, and will usually require two workers standing in the water to manually flip each (e.g. 90 kg) cage one at a time. For a large farming operation with many cages this represents a significant amount of work.

Different approaches have been developed to ease the work load required to effectively farm oysters and other shellfish species.

EP 0 681 783 describes a cage for rearing oysters which consists of a series of compartments, each designed to receive a bag of shellfish, and which is pivoted about axles resting on supports equipped with locking mechanisms to fix the cage in position. The cage sides and end walls are made from a large-size mesh to allow a free exchange between the inside of the cage and its outer environment.

U.S. Pat. No. 5,438,958 discloses an open water mariculture facility including a central platform/support structure from which a plurality of cylindrical, ballastable cage structures emanate for containing and maintaining a marine species. The ballastable cages can be raised for maintenance, and the system provides a rolling system for turning the cages on demand.

These prior systems are not well adapted for use in a floating cage system with such a large number of cages in series. Rather, these are stationary systems that only allow rotation about a centrally disposed axis.

The need therefore still exists to facilitate flipping such a large number of floating cages. The ideal cage flipper design should ideally be encompassed within or at least mountable on a fishing boat, avoid tangling of the cage tether lines, and have suitable properties to maintain buoyancy and stability of the boat.

SUMMARY

An aspect relates to a device for flipping or rotating a floating aquatic cage used in shellfish farming, particularly oyster farming.

According to an aspect of embodiments of the present invention there is provided a device for rotation of a floating aquatic cage. The device comprises a hollow cylindrical frame or housing defining a path through which the floating aquatic cage may pass, including entrance and exit openings; a guide assembly affixed to the entrance of the hollow cylindrical frame or housing to receive and guide the floating aquatic cage inside the device; a spiral path formed in a sidewall of the hollow cylindrical frame or housing and through which a tether line attached to the floating aquatic cage may pass; and a plurality of helical guide elements positioned on an inside surface of the hollow cylindrical frame or housing and dimensioned to form an obstruction to opposing corners of the floating aquatic cage, and to impart a helical turning force in such a manner as to rotate the floating aquatic cage along a length of the hollow cylindrical frame or housing from the entrance opening to the exit opening.

In certain non-limiting embodiments of the device, the hollow cylindrical frame or housing may include a support beam (11), a plurality of ring structures (12a) affixed along a length of the support beam (11) to form a cylindrical arrangement; a bumper (13) affixed along a side of the device to at least one of the ring structures (12a); and a sidewall (22) affixed along the inside of the ring structures (12a) and forming at least a partial interior surface inside the device (10).

In further non-limiting embodiments, the guide assembly may include a frame (14) mounted to the support beam (11) at the entrance end of the hollow cylindrical frame or housing, including top, side and bottom portions (14a,b,c,d);

outwardly flaring cage guides (15,17) mounted on the side portions (14*b,c*) of the frame (14); and outwardly flaring tether line guides (16,18) spaced apart and mounted to the bottom portion (14*d*) of the frame (14), the tether line guides (16,18) forming the opening of the spiral path (20).

The spiral path (20) may, in further embodiments, include bands (21*a,b*), which are continuous with the tether line guides (16,18) and extend along the spiral path (20), starting at the bottom of the device (10) within the guide assembly (14,15,16,17,18) and ending at or near the top of the device (10) at the exit opening.

According to a further aspect of embodiments of the present invention there is provided a device for rotation of a floating aquatic cage. The device comprises a hollow frame or housing defining a path through which the floating aquatic cage may pass, including entrance and exit openings; and a guide element positioned on an inside surface of the hollow frame or housing and dimensioned to form an obstruction to at least one corner of the floating aquatic cage, and to impart a turning force in such a manner as to rotate the floating aquatic cage along a length of the hollow frame or housing from the entrance opening to the exit opening. In some embodiments, a guide assembly may affix to the entrance of the hollow frame or housing to receive and guide the floating aquatic cage inside the device.

In certain non-limited embodiments, the device comprises one or more support beams (11), a plurality of support structures (12) affixed along a length of the one or more support beams (11), the plurality of support structures arranged to form a top and two opposing sides; a plurality of guide element supports extending between the guide element and at least one of the plurality of support structures; and an at least one sidewall (22) affixed along the inside of the support structures (12) and forming at least a partial interior surface inside the device (10). In some embodiments, a bumper (13) may be affixed along the inner surface of the device to contact the floating aquatic cage during rotation.

In certain non-limited embodiments, the guide elements rotate the floating aquatic cage at least 65 degrees from a horizontal plane defined by a surface of the water.

In certain non-limited embodiments, the guide element may form a continuous ramp that rises or inclines from the entrance opening toward the exit opening. The continuous ramp may be curvilinear, linear, or helical. The guide element may remain stationary relative to the hollow frame or housing when it imparts its helical turning force.

It is also envisioned that further embodiments of the device may include a boat mounting system. For example, such a boat mounting system may include a plurality of boat mounting brackets (30), each including a height adjustable sleeve portion (32); and an equal number of mounting posts (31) affixed to a surface of the hollow cylindrical frame, the mounting posts (31) being dimensioned to receive the height adjustable sleeve portions (32) of the boat mounting brackets (30) and removably connect the boat mounting brackets (30) to the hollow cylindrical frame. The mounting posts may form part of the hollow cylindrical frame or housing. Some embodiments of the device may also include receiving brackets (35) for mounting to the gunwale (36) of the boat (37). The receiving brackets (35) will ideally be dimensioned to receive and affix the boat mounting brackets (30) to the boat.

The receiving brackets (35), in further embodiments of the device, may be adjustable horizontally. For example, the boat mounting brackets (30) may include a substantially horizontal portion with a plurality of holes, wherein a corresponding set of holes are formed in the receiving brackets (35). These holes provide a horizontally adjustable mechanism for connecting the device to the boat, e.g. using bolts or other appropriate fastening device.

In addition, the height adjustable sleeve portions (32) of the boat mounting brackets (30) may include holes (40) formed along the vertical axis thereof, with a corresponding set of holes (41) formed along the vertical axis of the mounting posts (31). These holes (40,41) provide a height adjustable mechanism for raising or lowering the height of the device on a boat.

In some embodiments, the boat mounting brackets may form a pivotal connection with the receiving brackets. The device may pivot, on a pivot axis defined by the pivotal connection, between a deployed position and a stowed position. The boat mounting system may comprise a boat cushion connected to one or more of the plurality of boat mounting brackets. The boat cushion may connect to the boat mounting bracket by a pivotal connection.

According to a further aspect of embodiments of the present invention there is provided a device for rotation of a floating aquatic cage. The device comprises a plurality of float elements; a hollow cylindrical frame or housing mounted to the plurality of float elements, the hollow cylindrical frame or housing and float elements arranged to define a path through which the floating aquatic cage may pass, including entrance and exit openings; and a guide element positioned on an inside surface of the hollow cylindrical frame or housing and dimensioned to form an obstruction to one side of the floating aquatic cage, and to impart a turning force in such a manner as to rotate the floating aquatic cage along a length of the hollow cylindrical frame or housing from the entrance opening to the exit opening.

In certain non-limited embodiments, the float elements may define a guide assembly located near or at the entrance of the hollow cylindrical frame or housing to receive and guide the floating aquatic cage inside the device. The guide element may be structured to rotate at least part of the aquatic cage onto a top surface of one of the plurality of float elements. The device may comprise a line hauler structured to contact a tether line. The float elements may be pontoons.

BRIEF DESCRIPTION

Some of the embodiments will be described in detail, with references to the following Figures, wherein like designations denote like members, wherein.

DETAILED DESCRIPTION

Described herein is a floating aquatic cage rotation device which can be used in the management of shellfish farming cages, such as oyster cages, including but not limited to defouling, maintenance and harvesting procedures.

Figure 1A:
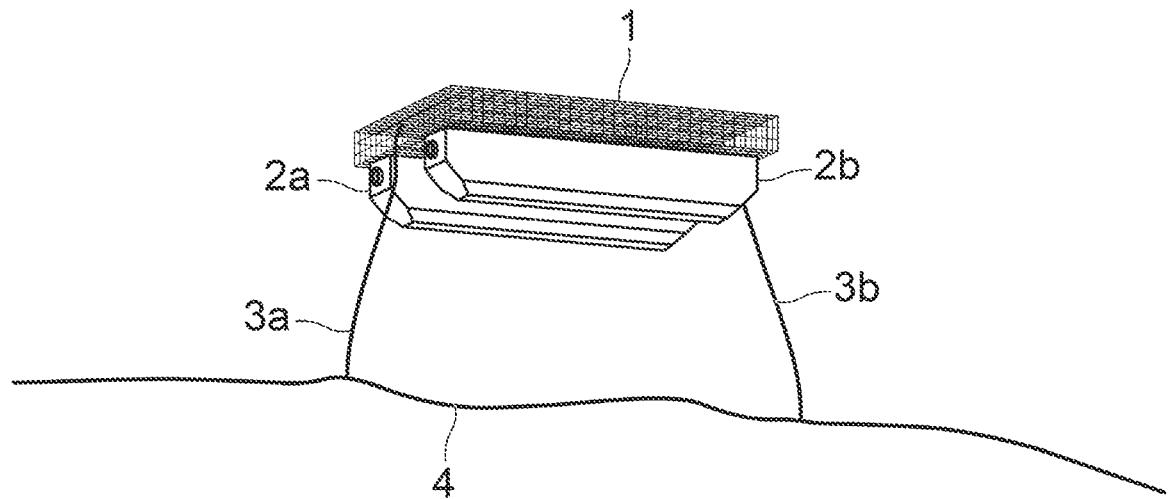
FIG. 1A shows an example of a bottom perspective view of a typical floating cage and anchoring system used in shellfish farming applications.
Figure 1B:
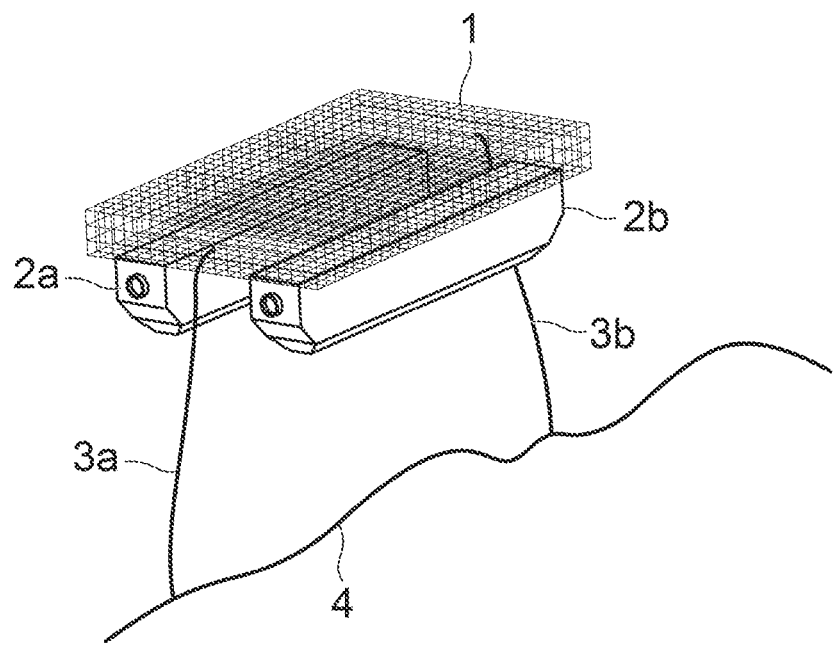
FIG. 1B shows a top perspective view of a typical floating cage and anchoring system used in shellfish farming applications.
Figure 2:
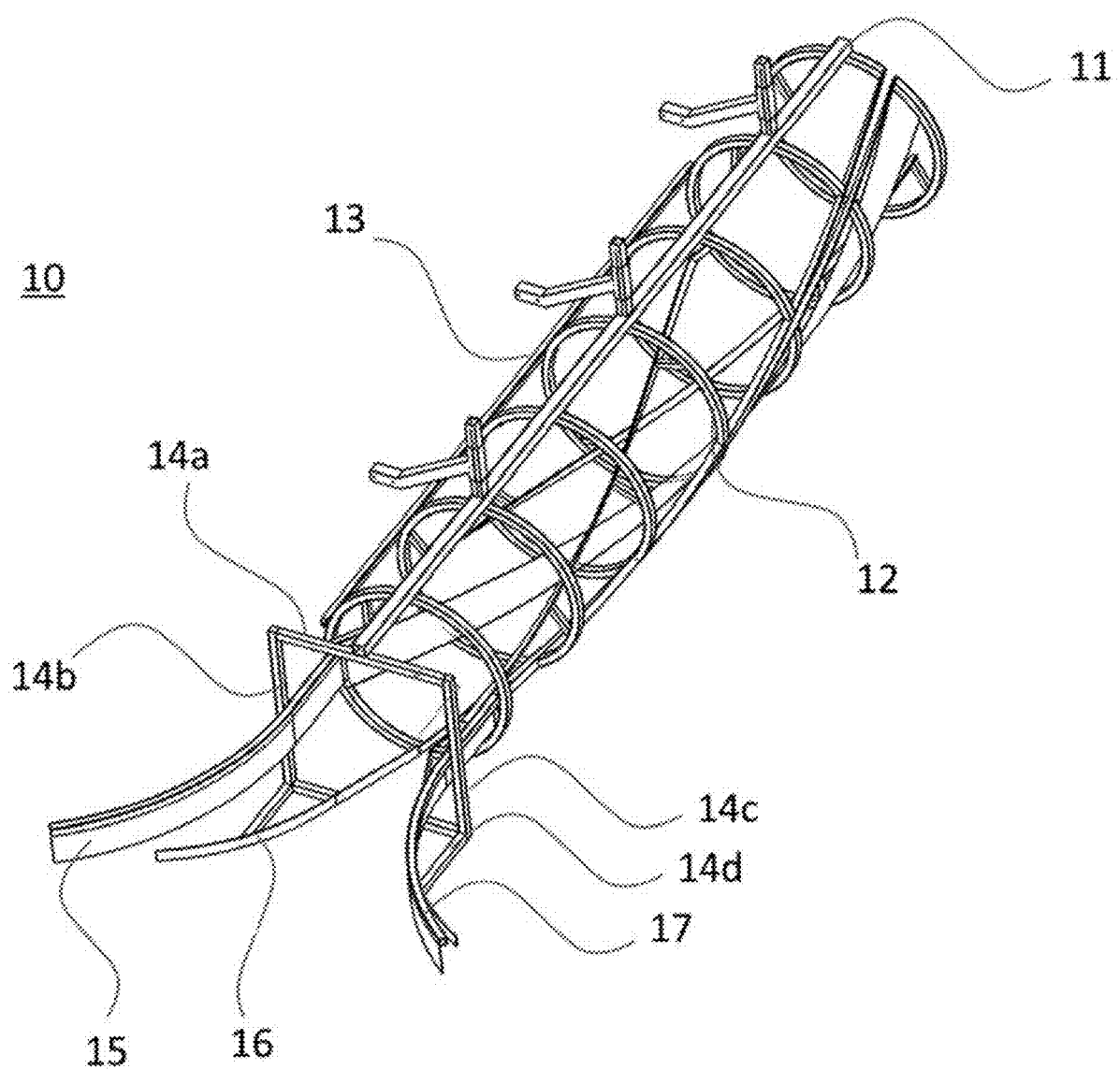
FIG. 2 shows a top perspective view of an example of a floating aquatic cage rotation device, in accordance with an embodiment of the present invention.
Figure 10:
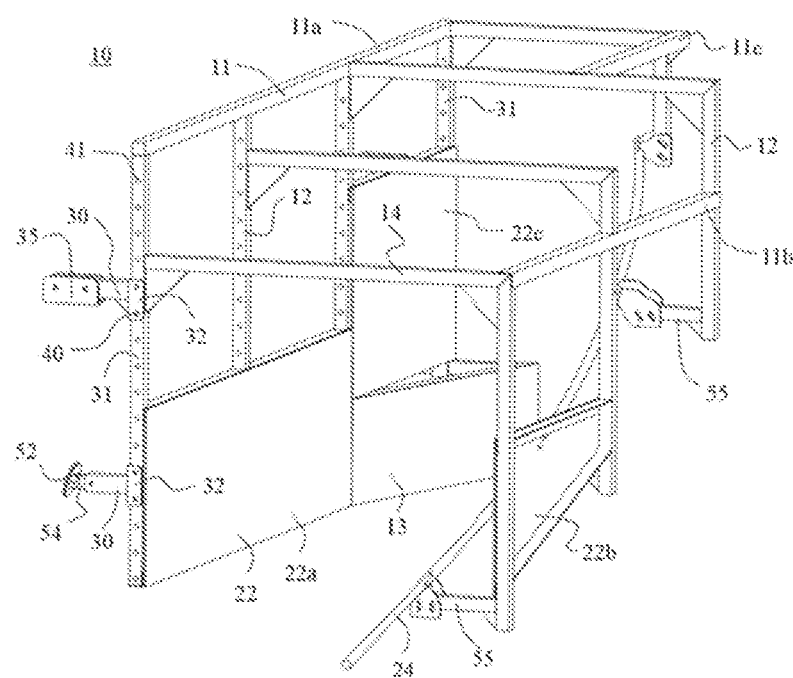
FIG. 10 shows a perspective view of the floating aquatic cage rotation device illustrated in FIG. 9.

As illustrated in FIG. 2, the device (10) has an elongate structure comprising a support beam (11), along which a plurality of support structures (12) are affixed. In some embodiments, each support structure (12) is positioned along a central axis of the device to form a cylindrical-type arrangement. Parts of support structure (12) may be shaped like a ring, such as ring support (12a). As shown in FIG. 10, support beam (11) may comprise a plurality of support beams (11a,b,c) with structures (12) mounted on the plurality of support beams. Also shown in FIG. 10, support structure (12) may define one or more non-curved shapes.

Figure 9:
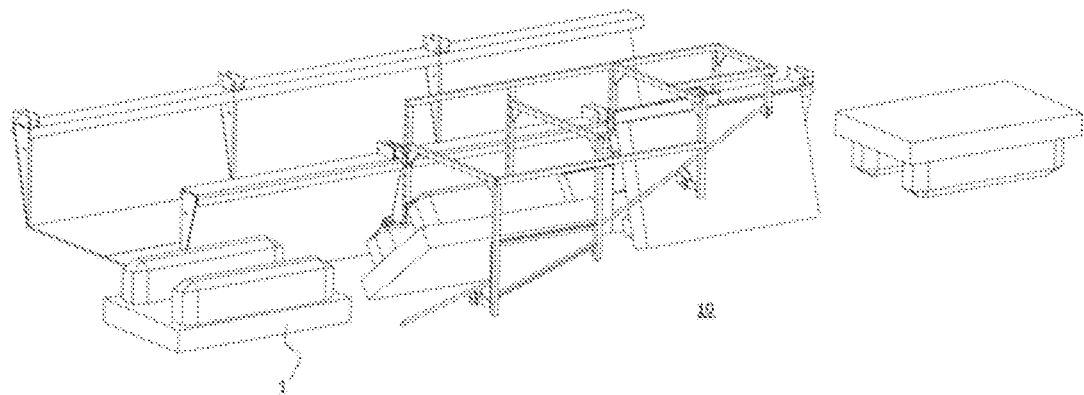
FIG. 9 shows a schematic diagram of a further example of the floating aquatic cage rotation device in accordance with an embodiment of the present invention, at four different stages as a floating cage enters and passes through the interior space of the device.
Figure 19:
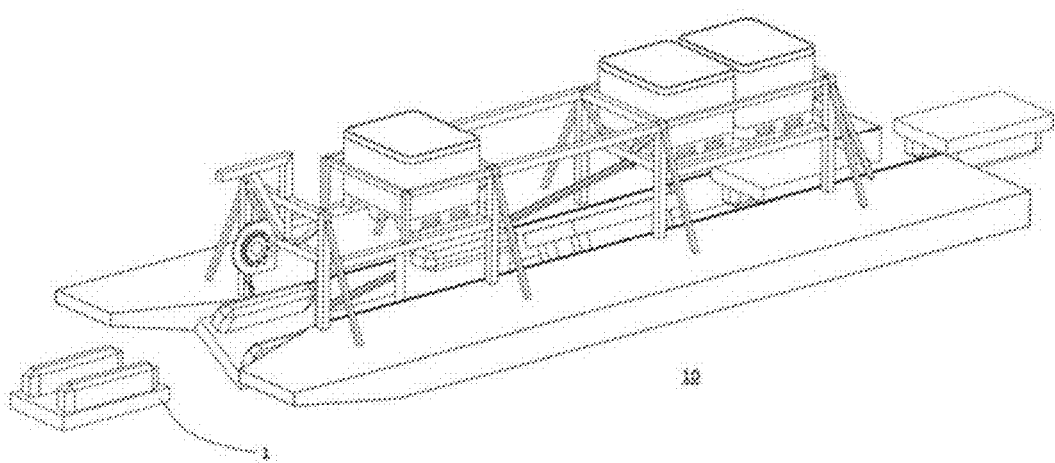
FIG. 19 shows a schematic diagram of the floating aquatic cage rotation device illustrated in FIG. 16, at six different stages as a floating cage enters and passes through the interior space of the device.

In some embodiments, the hollow frame or housing may define a path through which the floating aquatic cage may pass. The path of the aquatic cage may include entrance and exit openings. As illustrated in FIGS. 2, 9 and 19, the floating cage may travel through the path in a continuous fashion from the entrance to the exit openings. In some cases, the path may have multiple stages, such as a rotation stage (60), a stalled stage (61), a floating or non-rotation stage (62), for example as shown in FIG. 19. The cage may undergo maintenance or harvesting by a user while in an appropriate stage, such as the stalled stage (61).

As shown in FIG. 2, a bumper (13) is affixed along one side of the device, in certain embodiments connecting at least a portion of the ring structures (12a). The bumper (13) rests along the side of the boat when mounted, and may include a protective material (such as, but not limited to a foam or rubber pad) to protect the sidewall of the boat from damage during use. Bumper (13) may be positioned to contact the cage during rotation. As shown in FIG. 10, bumper (13) may be arranged near the exit opening to contact the cage.

Figure 3:
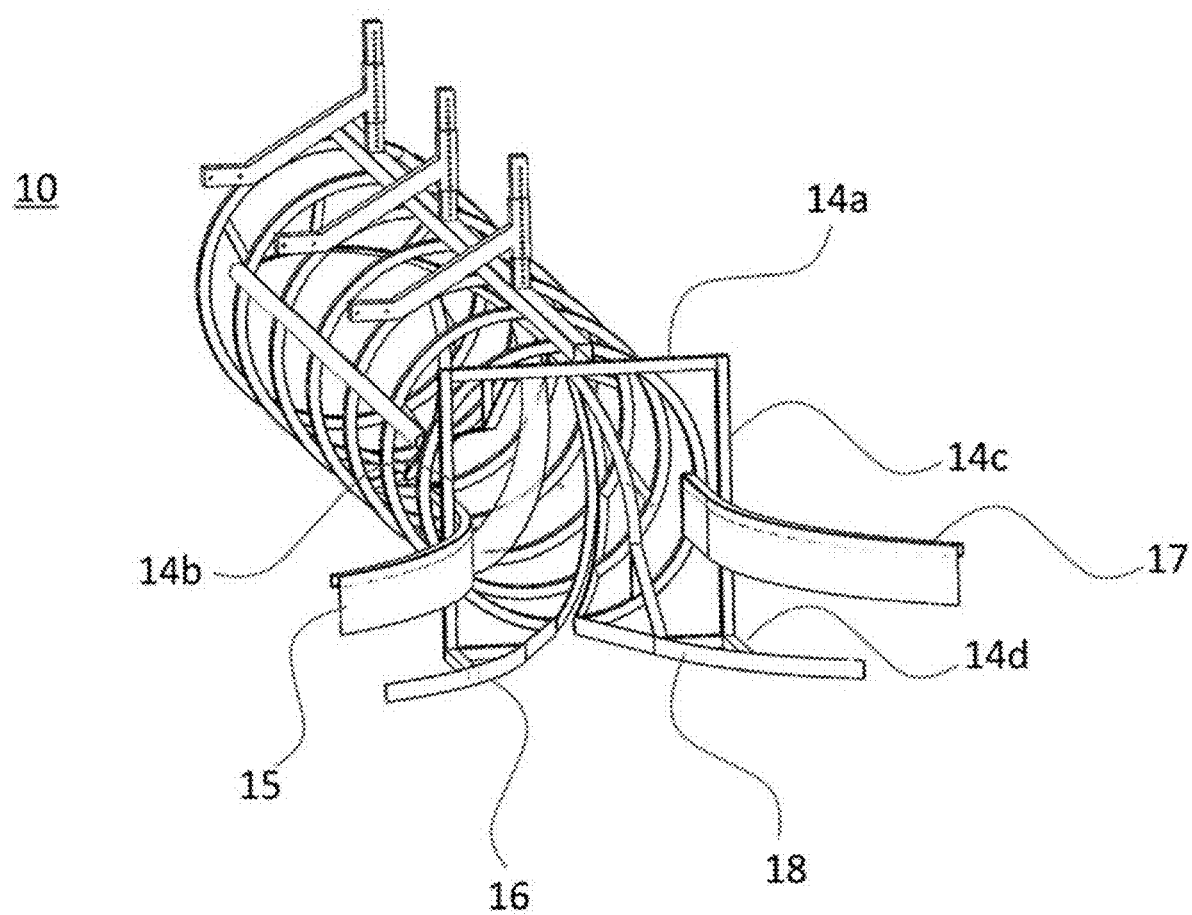
FIG. 3 shows a front perspective view of the floating aquatic cage rotation device illustrated in FIG. 2.

Guide assembly (14,15,16,17,18) is provided at the mouth of the device (10) to guide the floating cages and the tether lines inside the device, when mounted to the side of a boat, during a drive-by operation. One example of the guide assembly is shown in detail in FIG. 3, and includes a square frame (14) mounted to the end of the support beam (11), including top, side and bottom portions (14a,b,c,d). Cage guides (15,17) are mounted on the side portions (14b,c) of the frame (14), centrally located within the frame (14) and flaring outwardly to facilitate the capture of cages floating at the surface of the water. Tether line guides (16,18) are mounted at either side of the bottom portion (14d) of the frame (14), each flaring outwardly and forming the opening of a spiral path (20) through which the tether lines affixing the floating cages to the bottom anchor line can pass.

Figure 4:
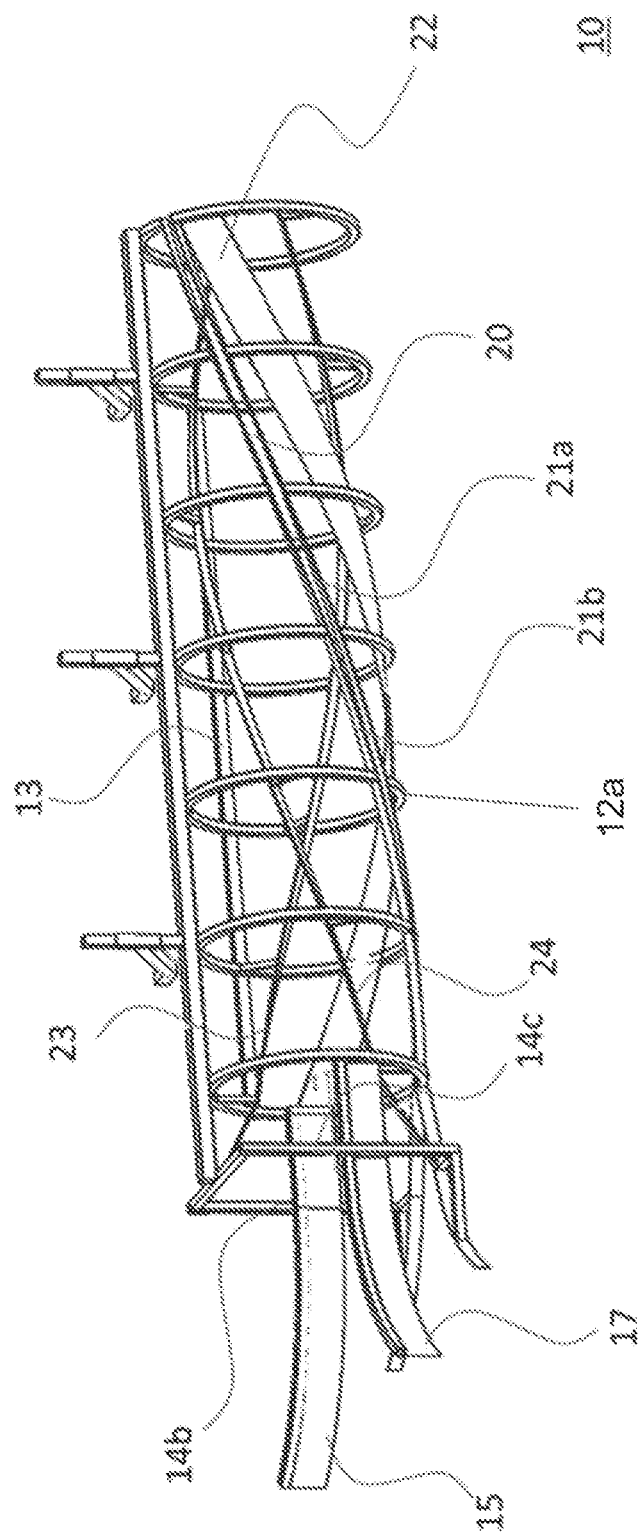
FIG. 4 shows a side perspective view of the floating aquatic cage rotation device illustrated in FIG. 2.

The spiral path (20) can be seen in greater detail in FIG. 4, including bands (21a,b), which are continuous with the tether line guides (16,18) and define the spiral path (20) formed in the wall of the device. The spiral path (20) starts at the bottom of the device (10) within the guide assembly (14,15,16,17,18) structure and ends at or near the top of the device (10) where the cage exits. The spiral path (20) does not pass through the side of the device that is attached to the boat and acts like a guide. In some embodiments, the path (20) is non-spiral. As shown in FIGS. 10-18, path (20) may be shared with the cage travel path. In these embodiments and others, the path (20) may be linear from entrance opening to exit opening. The top and two opposing sides of support structure (12) may form the path (20). In such cases, support structure (12) may have an open side, such as the bottom side, to allow for the tether line to pass through the device.

A sidewall (22) is affixed along the inside of the support structures (12). The sidewall (22) may include a full enclosure of the support structures, although in preferred embodiments will include only a partial enclosure in order to minimize weight. It serves to further strengthen the apparatus and at the same time prevent the cage from escaping or getting caught between the support structures (12) as it passes through the device (10). As shown in FIG. 10, sidewall (22) may be a plurality of sidewalls (22a,b,c) affixed to the support structures (12).

As shown in FIGS. 2-7, helical guides (23,24) are also affixed within the ring structures (12a), and obstruct the path of the cage as it moves through the device in such a manner as to impart a helical turning force. The first guide (23) is positioned to contact the top of the cage as it enters the device and push it down while continuing in a circular motion through to the exit end of the device. The second guide (24) is positioned to contact the bottom of the cage on the opposite side from the first guide (23) and lift the cage while continuing in a circular motion through to the exit end of the device. When the force exerted by both helical guides (23,24) are combined simultaneously, the cage will rotate.

A guide element (20) may be positioned on an inside surface of the hollow frame or housing and dimensioned to form an obstruction to at least one corner of the floating aquatic cage. The guide element may impart a turning force in such a manner as to rotate the floating aquatic cage along a length of the hollow frame or housing from the entrance opening to the exit opening. Guide element (20) may rotate the floating aquatic cage to a sufficient degree, such as at least 65 degrees, from a horizontal plane defined by a surface of the water. Full rotation of the cage may be assisted by the one or more bumpers (13) or sidewalls (22). As illustrated in FIG. 10, the one or more guide element (20) may be mounted to the hollow frame or housing by a plurality of guide element supports (55). The guide element supports (55) may extend between the guide element (20) and at least one of the plurality of support structures (12).

Figure 16:
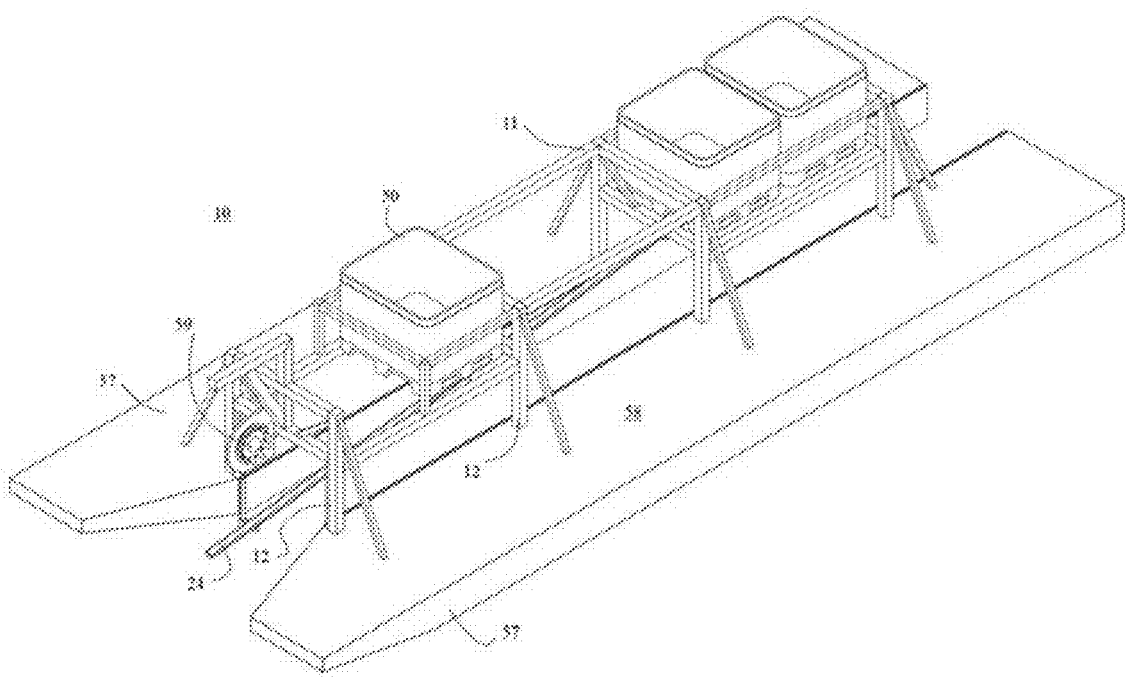
FIG. 16 shows a perspective view of a further example of the floating aquatic cage rotation device in accordance with an embodiment of the present invention.

The guide element (20) may have a suitable shape, such as helical (FIG. 2), curvilinear (FIG. 10) or linear (FIG. 16). The guide element may form a continuous ramp that rises from the entrance opening toward the exit opening. The ramp may raise one end of the cage above another which causes rotation of the cage. The buoyancy of the cage may assist to stabilize the cage during rotation. Guide element (20) may remain stationary, relative to the hollow frame or housing, when it imparts its helical turning force to rotate the aquatic cage. In some cases, the one or more guide elements are rails or tracks that contact the cages.

Figure 5:
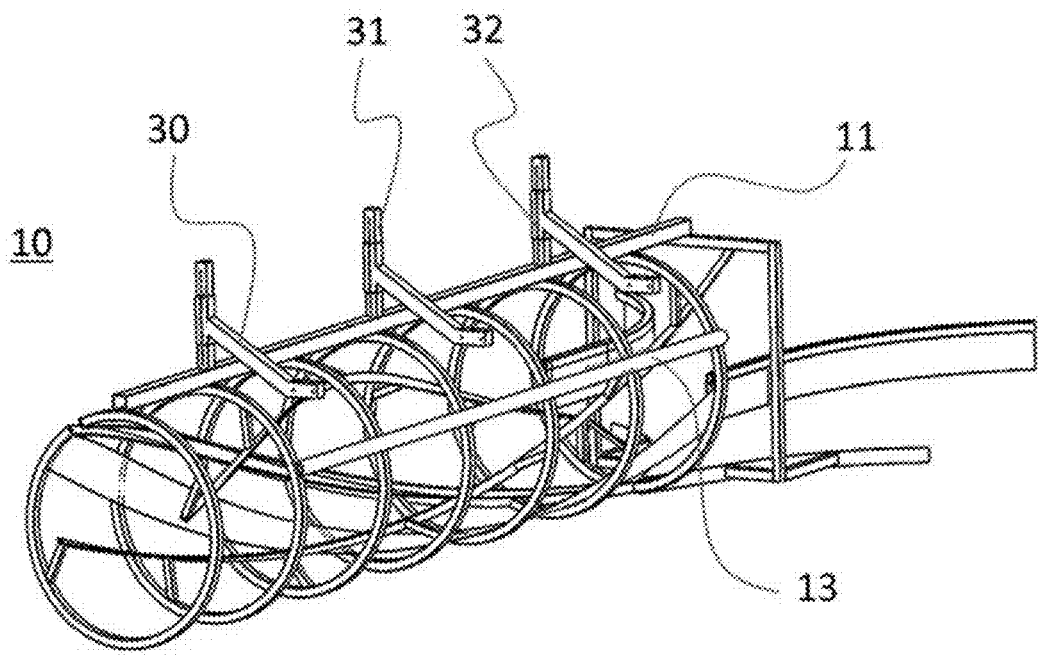
FIG. 5 shows an opposing side view of the floating aquatic cage rotation device illustrated in FIG. 4.

FIG. 5 illustrates the boat-mounting side of the device (10), including the bumper (13) and three boat mounting brackets (30) which include a height adjustable sleeve portion (32) via which the mounting brackets (30) are affixed to a mounting post (31), which in turn extends vertically from the support beam (11).

Figure 6:
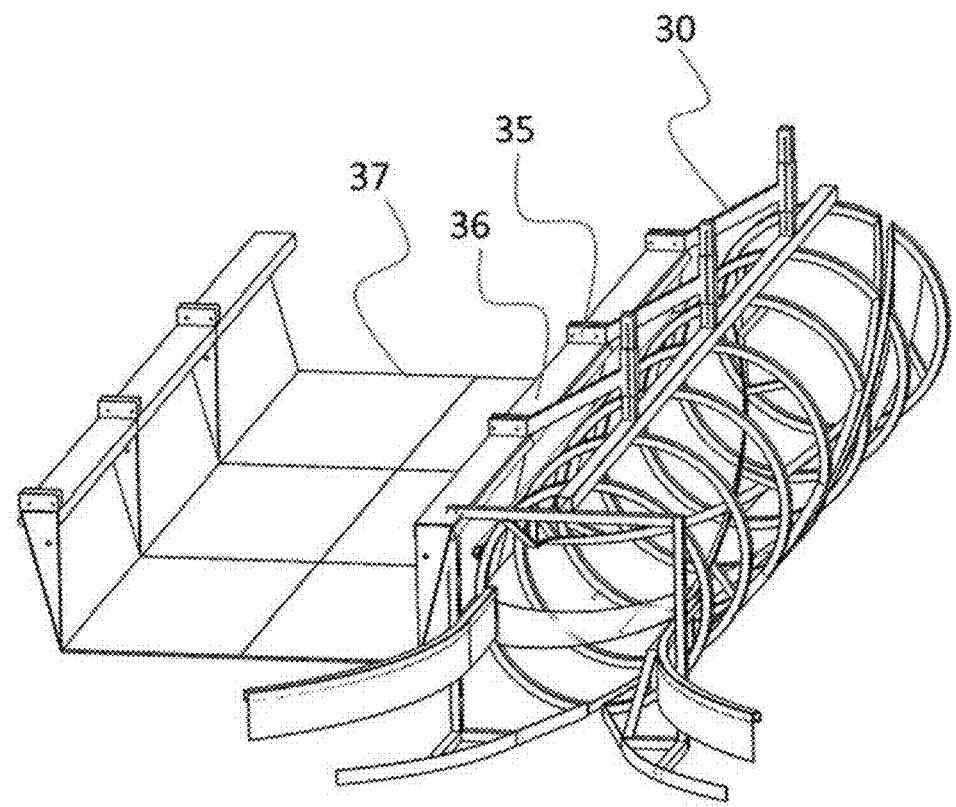
FIG. 6 shows a front view of the floating aquatic cage rotation device illustrated in FIG. 2, attached to the side of a boat.

As illustrated in FIG. 6, the boat mounting brackets (30) may be angled downward, and terminate in a substantially horizontal portion which fits into a receiving bracket (35) mounted to the gunwale (36) of the boat (37). In certain embodiments, the horizontal portion of the mounting brackets (30) as well as the receiving brackets (35) may include multiple holes to allow for the device (10) to be adjustable horizontally on the boat. The boat mounting brackets (30) can be connected to the receiving brackets (35) in a variety of ways, including bolts, welding, rivets or any other means to secure the device (10) to the boat (37).

Figure 7:
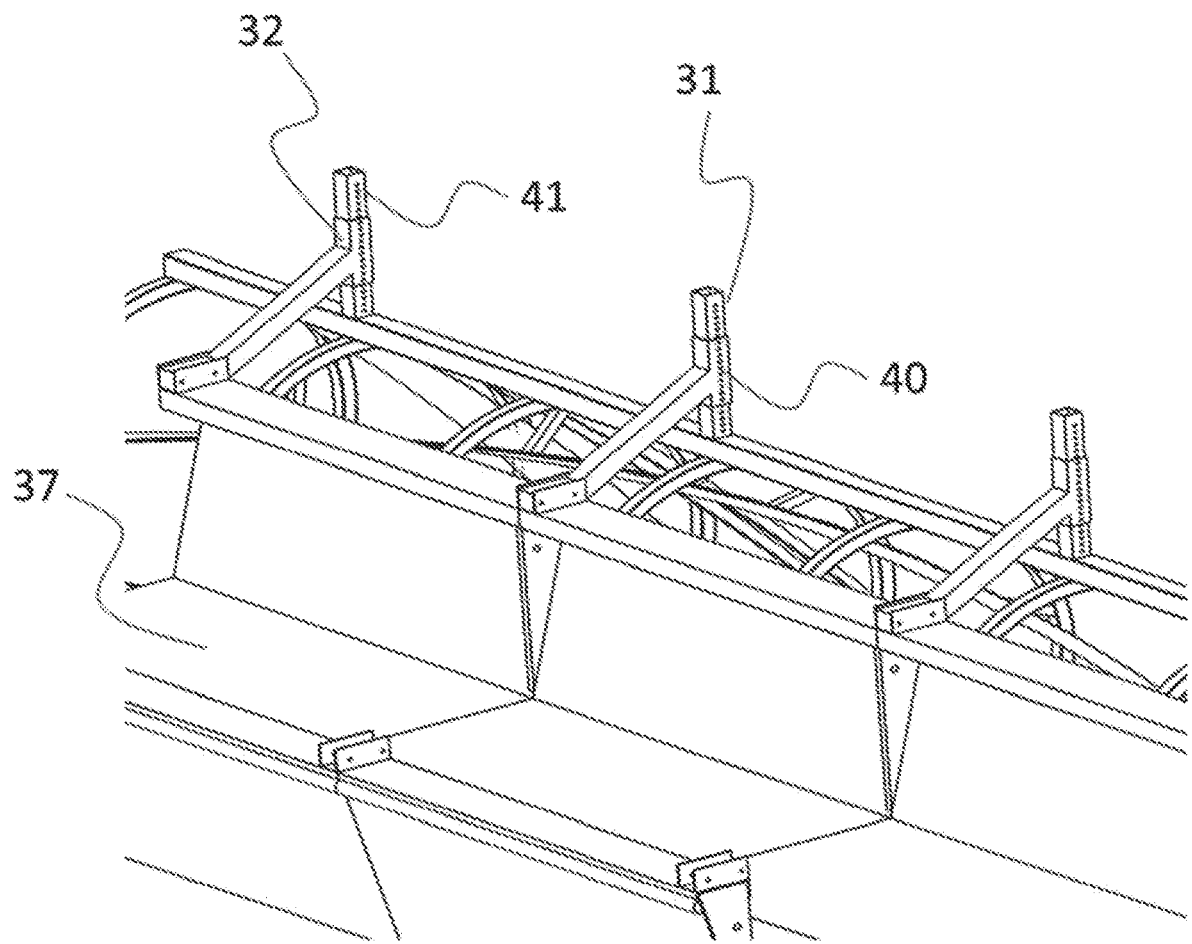
FIG. 7 shows an enlarged view of the floating aquatic cage rotation device illustrated in FIG. 6, visible from the inside of the boat.

FIG. 7 shows an enlarged view of one possible example of the height adjustable sleeve portions (32) of the boat mounting brackets (30). As shown, the sleeve portions (32) include a plurality of holes (40) drilled or otherwise formed along the vertical axis thereof. A corresponding set of holes (41) are drilled or otherwise formed along the vertical axis of the mounting posts (31).

Figure 13:
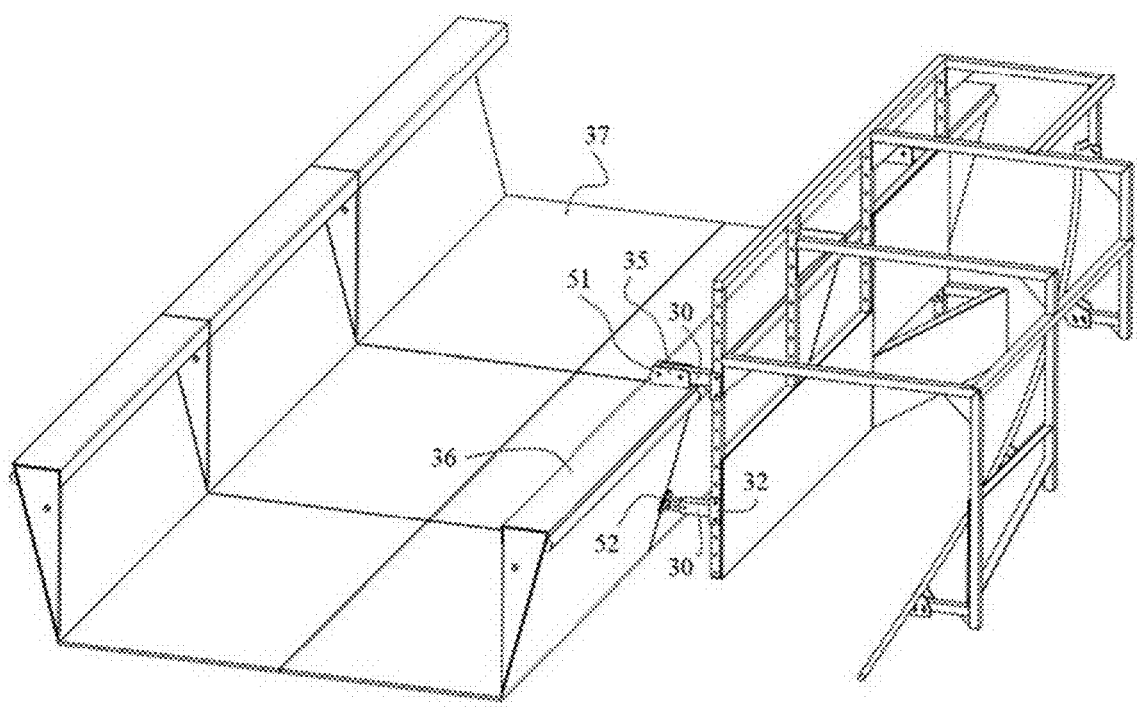
FIG. 13 shows a perspective view of the floating aquatic cage rotation device illustrated in FIG. 9, attached to the side of the boat in a deployed position.
Figure 14:
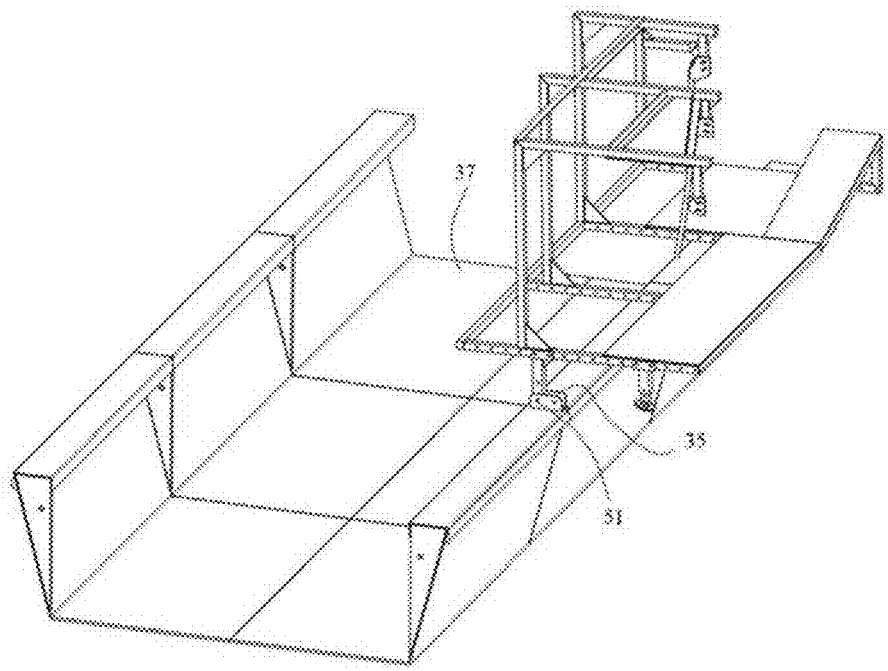
FIG. 14 shows a perspective view of the floating aquatic cage rotation device illustrated in FIG. 9 attached to the side of the boat in an intermediate position.
Figure 15:
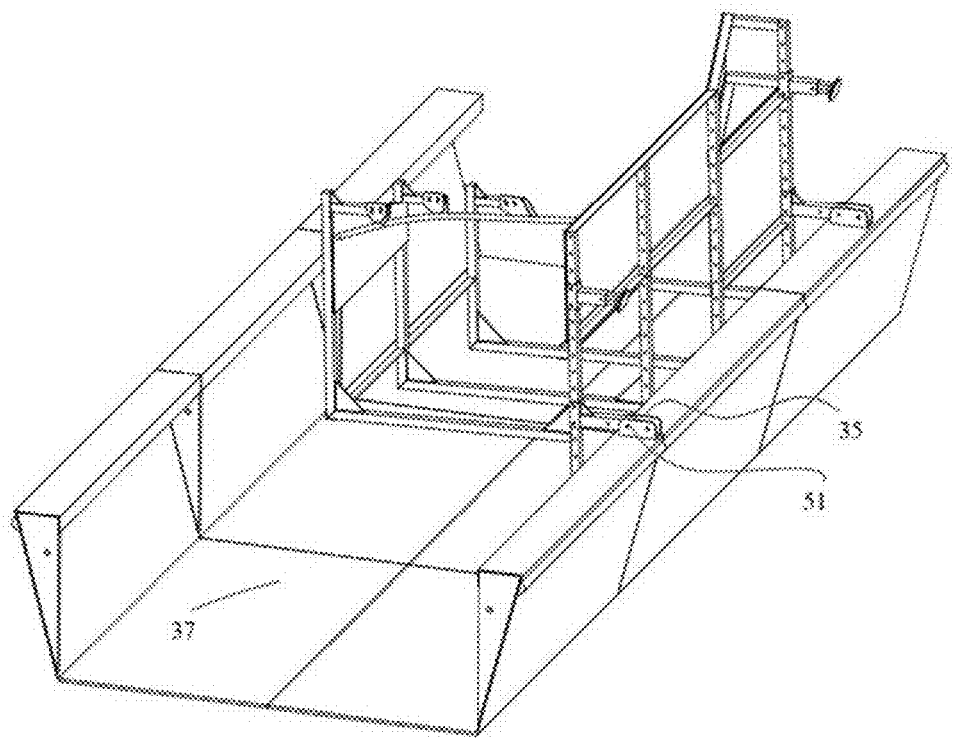
FIG. 15 shows a perspective view of the floating aquatic cage rotation device illustrated in FIG. 9 attached to the side of the boat in a stowed position.

FIGS. 10 and 13 show another example of the boat mounting system. In such embodiments and others, the mounting posts (31) form part of the hollow frame or housing, such as the support structures (12). The boat mounting brackets (30) may connect to the receiving bracket (35) via a suitable pivoting connection, such as pivot pin (51). The device (10) may pivot on a pivot axis defined by the pivot pin (51). The device may be pivoted between a deployed position (FIG. 13) and a stowed position (FIGS. 14, 15). The deployed position may be when the device (10) is adjacent to the boat (37) or at least partially submerged. The stowed position may be when device (10) is no longer submerged (FIG. 14) or when the device (10) is completely on the boat (FIG. 15).

Figure 11:
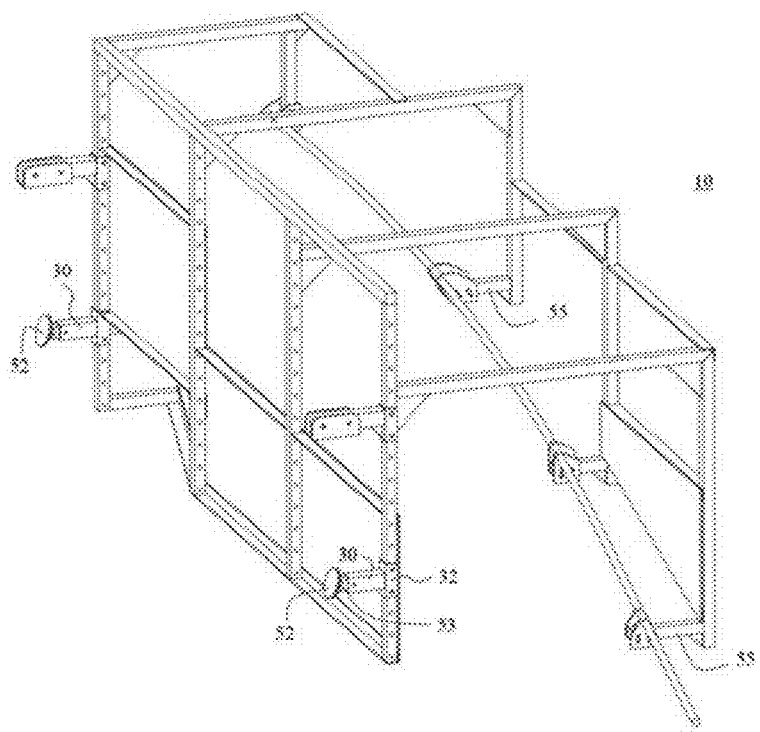
FIG. 11 shows an opposing perspective view of the floating aquatic cage rotation device illustrated in FIG. 9.
Figure 12:
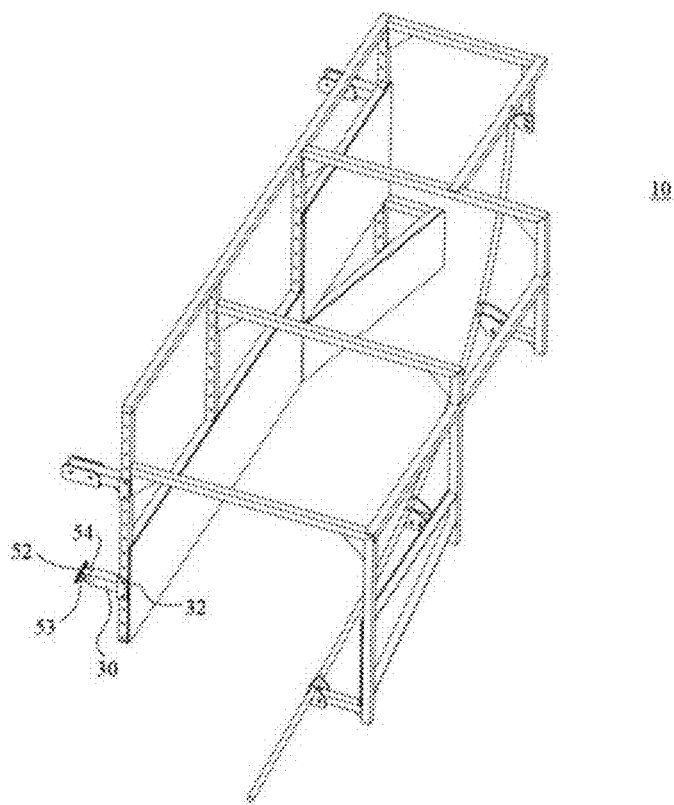
FIG. 12 shows a top perspective view of the floating aquatic cage rotation device illustrated in FIG. 9.

As illustrated in FIGS. 10-12, the boat mounting system may comprise one or more boat cushions (52) connected to one or more of the plurality of boat mounting brackets (30). The boat cushion (52) may provide a buffer between the hollow frame or housing and the boat and prevent damage to the boat during use. In some cases, the boat cushion prevents damage during rotation of the device between the stowed and deployed positions. The length and orientation of the boat cushion may be adjusted to accommodate different boat shapes and sizes. The boat cushion (52) may connect to the boat mounting bracket by a suitable pivotal connection, such as a pivot pin (53), living hinge, ball-and-socket, and others. The length of boat cushion (52) may be adjusted by a suitable mechanism, such as the telescopic mechanism depicted in FIGS. 10-12. The telescopic mechanism may be an inner sleeve (54) within the boat mounting bracket (30) with a locking mechanism, such as a locking pin, to set the length.

Figure 8:
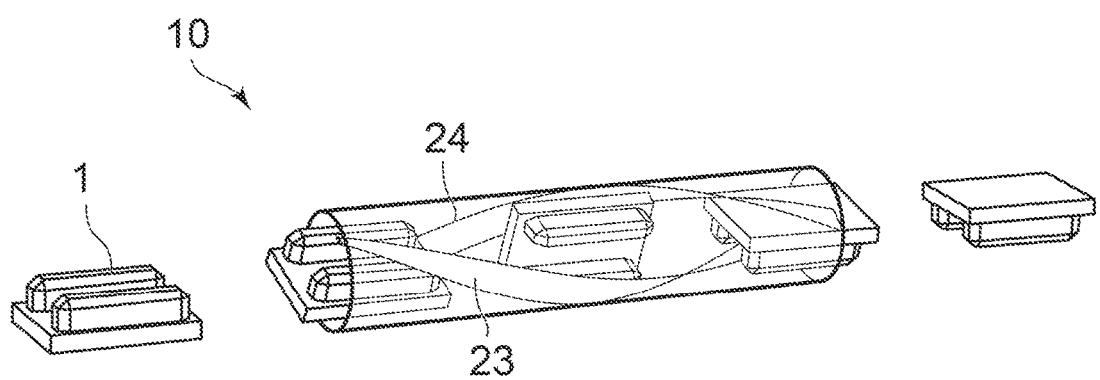
FIG. 8 shows a schematic diagram of the floating aquatic cage rotation device illustrated in FIG. 2, at five different stages as a floating aquatic cage enters and passes through the interior space of the device.

In operation, as can be seen in FIG. 8, a boat operator is able to work alone to flip the floating cages without having to stop. The operator need only guide the cages into the device as the boat remains in motion. Within the device (10), the cage (1) encounters the helical guides (23,24) that provide the needed obstructions to cause the cage (1) to rotate before exiting the device. The tether lines connecting the cages (1) together traverse the spiral path (20) formed by bands (21a,b). In certain non-limiting embodiments, the helical guides (23,24) may be positioned such that the cages rotate greater than 180 degrees, e.g. approximately 210 degrees, as they pass through and exit the device (10). In such embodiments, while rotating within the cage, the oysters get pushed to one side and become redistributed evenly throughout the cage. This is advantageous since it increases exposure to UV light and air. It also prevents the cages from flipping back before the critical exposure time is completed.

It is also envisioned that various modifications and optional adaptations of the disclosed device may be made, either to adapt to location, equipment or procedural requirements.

As illustrated in FIGS. 16-19, some embodiments of the device may be self buoyant. In some embodiments, the device would be adapted such that it can displace enough water in order to make it buoyant. This can be accomplished through, for example, sealing all the openings in the hollow aluminum tubing, or alternatively, by filling the hollow tubing with foam to provide buoyancy. Alternatively, a plurality of float elements, such as pontoons, may be mounted e.g. on the bottom of the device. One end of the float elements, such as a front end, may define the guide assembly to guide the aquatic cages into the cage path. The cage path may be defined by the pontoons and the support structures (12). Guide element (20) may be structured to rotate at least part of the aquatic cage onto a top surface (58) of one of the plurality of float elements (57). The device 10 may comprise a line hauler (59) structured to contact a tether line. The line hauler (59) may be used to keep the device straight and may be used to travel along the tether line to the aquatic cages.

Device (10) may form part of a pontoon boat. The pontoon boat may allow oyster cages to pass through a center path. The pontoon boat may permit easier and more comfortable access to cages from both sides of the tether line. A line hauler may be used for moving the boat forward, and keep it straight. The design as shown in FIG. 16 may allow more room between the boat and nearby cage lines. A plurality of pontoons (57) may offer a more balanced design. In some cases, one or more pontoons may be used in combination with a boat (37) to better balance the device (10). The boat pontoon boat may be a suitable size, for example 25 feet long and 12 feet wide, 35 feet long and 14 feet wide, and others. The guide may be in the center path of the pontoon boat. A location at or near a rear of the boat may be used by a user to access flipped cages. Oysters may be removed from bags and dumped into coolers (50) above to keep them cool and fresh. After removing oysters from a cage, it may be returned to the path and exit in the drying position (cage up). The drying position may assist in observing which cages contain oysters. Motors may be mounted on pontoon (57) (not pictured). Some examples of suitable motors are outboard motors, electric motors, single or multi-propeller, and others. The device may comprise additional components, such as boat's steering and throttle controls, the hydraulic power pack, gas tank, hydraulic hauler controls, and others.

In addition, in certain embodiments the cage guides may be made of a suitable material, such as shaped aluminum. The cage guides may be covered with a covering made of a suitable material, such as polyethylene. This covering can reduce the friction with the cage while it passes through the device, and thereby reduce the wear on the cages. The material used may be removable and replaceable as it wears down over time.

In addition, a guide may be added along both sides of the path (20), the sidewalls (22, 22*a,b,c*) or both, which may allow the rope to pass through the unit to reduce rope damage and minimize entanglement. The guide can also be removable and replaceable as it wears down over time. The guide may be made of a suitable material, such as polyethylene.

Figure 17:
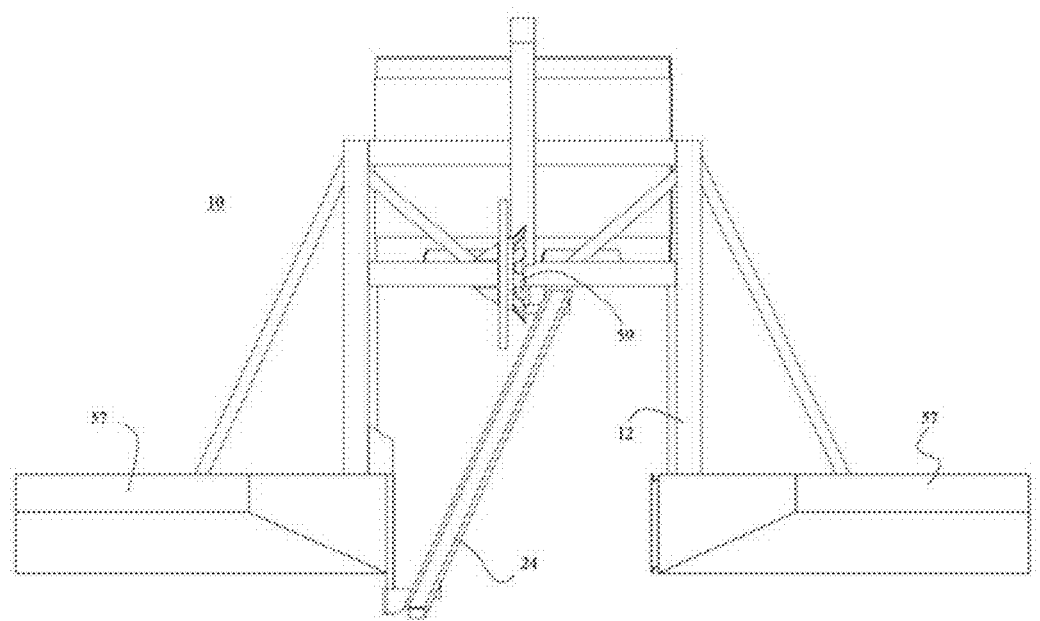
FIG. 17 shows a front view of the floating aquatic cage rotation device illustrated in FIG. 16.
Figure 18:
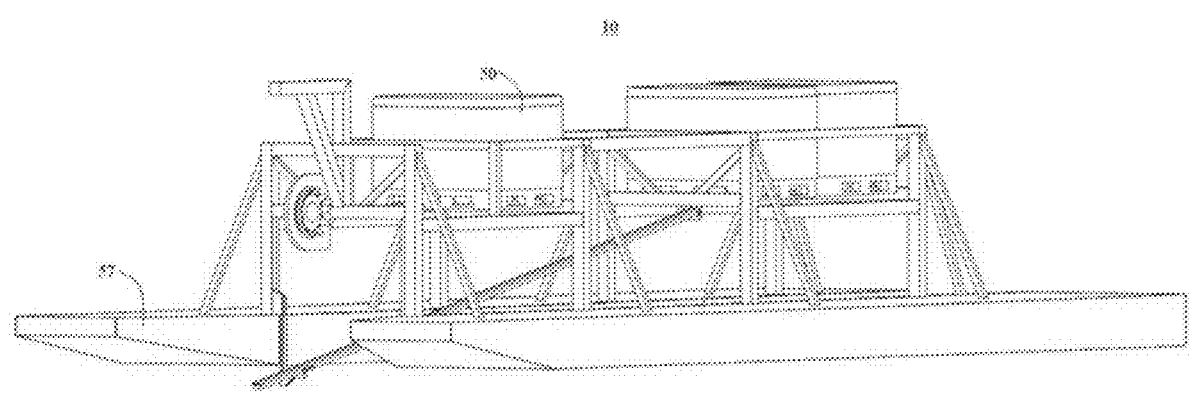
FIG. 18 shows a side perspective view of the floating aquatic cage rotation device illustrated in FIG. 16.

The device may be used for management or maintenance of an oyster farm. Maintenance of cages (1) may be considered as one or more of: emptying the cages, drying cages, harvesting oysters, flipping cages, and others. In some cases, the cages are partially flipped to provide a convenient access to the contents of the cages. Partially or fully rotated cages may be emptied of their contents or undergo maintenance as needed. As shown in FIGS. 16 - 18, coolers (50) may be used to store oysters once removed from the cage (1).

The device (10) may be made in various different dimensions, taking into account a number of factors including the size of the cages the device is to be used with, as well as the length of the boat, or simply to minimize weight, cost and/or transport/storage properties.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed is:

1. A device for rotation of a floating aquatic cage, comprising:
    a hollow cylindrical frame or housing defining a path through which the floating aquatic cage may pass, including entrance and exit openings, wherein the hollow cylindrical frame or housing comprise a support beam;
    a guide assembly affixed to an entrance of the hollow cylindrical frame or housing to receive and guide the floating aquatic cage inside the device, wherein the guide assembly comprises: a frame mounted to the support beam at the entrance end of the hollow cylindrical frame or housing, including top, side and bottom portions; outwardly flaring cage guides mounted on the side portions of the frame; and outwardly flaring tether line guides spaced apart and mounted to the bottom portion of the frame, the tether line guides forming the opening of the spiral path;
    a spiral path formed in a sidewall of the hollow cylindrical frame or housing and through which a tether line attached to the floating aquatic cage may pass; and
    a plurality of helical guide elements positioned on an inside surface of the hollow cylindrical frame or housing and dimensioned to form an obstruction to opposing corners of the floating aquatic cage, and to impart a helical turning force in such a manner as to rotate the floating aquatic cage along a length of the hollow cylindrical frame or housing from the entrance opening to the exit opening.

2. The device of claim 1, wherein the hollow cylindrical frame or housing comprises:
    a plurality of ring structures affixed along a length of the support beam to form a cylindrical arrangement;
    a bumper affixed along a side of the device to at least one of the ring structures; and
    a sidewall affixed along the inside of the ring structures and forming at least a partial interior surface inside the device.

3. The device of claim 1, wherein the spiral path comprises bands, which are continuous with the tether line guides and extend along the spiral path, starting at the bottom of the device within the guide assembly and ending at or near the top of the device at the exit opening.

4. The device of claim 1, further comprising a boat mounting system wherein the boat mounting system comprises:
    a plurality of boat mounting brackets, each including a height adjustable sleeve portion; and
    an equal number of mounting posts affixed to a surface of the hollow cylindrical frame, the mounting posts being dimensioned to receive the height adjustable sleeve portions of the boat mounting brackets and removably connect the boat mounting brackets to the hollow cylindrical frame.

5. The device of claim 4, further comprising receiving brackets for mounting to a gunwale of the boat, the receiving brackets being dimensioned to receive and affix the boat mounting brackets to the boat.

6. The device of claim 4, in which the mounting posts form part of the hollow cylindrical frame or housing and wherein the height adjustable sleeve portions of the boat mounting brackets include a plurality of holes formed along the vertical axis thereof, and wherein a corresponding set of holes are formed along the vertical axis of the mounting posts, the holes providing a height adjustable mechanism for raising or lowering the height of the device on a boat and connecting the device to the boat with bolts or other fastener.

7. The device of claim 5, wherein the receiving brackets are adjustable horizontally and wherein the boat mounting brackets include a substantially horizontal portion with a plurality of holes, and wherein a corresponding set of holes are formed in the receiving brackets, the holes providing a horizontally adjustable mechanism for connecting the device to the boat with bolts or other fastener.

8. The device of claim 5, in which the boat mounting brackets form a pivotal connection with the receiving brackets and wherein the device pivots on a pivot axis defined by the pivotal connection, between a deployed position and a stowed position.

9. The device of claim 4, in which the boat mounting system comprises a boat cushion connected to one or more of the plurality of boat mounting brackets and wherein the boat cushion is connected to the boat mounting bracket by a pivotal connection.

10. A device for rotation of a floating aquatic cage, comprising:
   a hollow frame or housing defining a path through which the floating aquatic cage may pass, including entrance and exit openings;
   a guide element positioned on an inside surface of the hollow frame or housing and dimensioned to form an obstruction to at least one corner of the floating aquatic cage, and to impart a turning force in such a manner as to rotate the floating aquatic cage along a length of the hollow frame or housing from the entrance opening to the exit opening; and
   a boat mounting system, wherein the boat mounting system comprises: a plurality of boat mounting brackets, each including a height adjustable sleeve portion; and an equal number of mounting posts affixed to a surface of the hollow frame, the mounting posts being dimensioned to receive the height adjustable sleeve portions of the boat mounting brackets and removably connect the boat mounting brackets to the hollow frame.

11. The device of claim 10, further comprising a guide assembly affixed to the entrance of the hollow frame or housing to receive and guide the floating aquatic cage inside the device.

12. The device of claim 10, wherein the hollow frame or housing comprises:
   one or more support beams;
   a plurality of support structures affixed along a length of the one or more support beams, the plurality of support structures arranged to form a top and two opposing sides;
   a plurality of guide element supports extending between the guide element and at least one of the plurality of support structures; and
   an at least one sidewall affixed along the inside of the support structures and forming at least a partial interior surface inside the device.

13. The device of claim 10, further comprising a bumper affixed along the inner surface of the device to contact the floating aquatic cage during rotation.

14. The device of claim 10, in which the guide elements rotate the floating aquatic cage at least 65 degrees from a horizontal plane defined by a surface of the water and wherein the guide element forms a continuous ramp that rises from the entrance opening toward the exit opening.

15. The device of claim 10, in which the guide element remains stationary relative to the hollow frame or housing when it imparts its turning force.

16. The device of claim 10, further comprising receiving brackets for mounting to a gunwale of the boat, the receiving brackets being dimensioned to receive and affix the boat mounting brackets to the boat, and wherein the receiving brackets are adjustable horizontally.

17. The device of claim 10, wherein the height adjustable sleeve portions of the boat mounting brackets include a plurality of holes formed along the vertical axis thereof, and wherein a corresponding set of holes are formed along the vertical axis of the mounting posts, the holes providing a height adjustable mechanism for raising or lowering the height of the device on a boat and connecting the device to the boat with bolts or other fastener.

18. The device of claim 10, wherein the boat mounting brackets include a substantially horizontal portion with a plurality of holes, and wherein a corresponding set of holes are formed in the receiving brackets, the holes providing a horizontally adjustable mechanism for connecting the device to the boat with bolts or other fastener.

19. The device of claim 10, in which the boat mounting brackets form a pivotal connection with the receiving brackets wherein the device pivots along a pivot axis defined by the pivotal connection, between a deployed position and a stowed position.

20. The device of claim 10, in which the boat mounting system comprises a boat cushion connected to one or more of the plurality of boat mounting brackets, and wherein the boat cushion is connected to the boat mounting bracket by a pivotal connection.

21. A device for rotation of a floating aquatic cage, comprising:
   a plurality of float elements;
   a hollow cylindrical frame or housing mounted to the plurality of float elements, the hollow cylindrical frame or housing and float elements arranged to define a path through which the floating aquatic cage may pass, including entrance and exit openings; and
   a guide element positioned on an inside surface of the hollow cylindrical frame or housing and dimensioned to form an obstruction to one side of the floating aquatic cage, and to impart a turning force in such a manner as to rotate the floating aquatic cage along a length of the hollow cylindrical frame or housing from the entrance opening to the exit opening, in which the guide element is structured to rotate at least part of the aquatic cage onto a top surface of one of the plurality of float elements.

22. The device of claim 21, in which a first end of the float elements define a guide assembly located near or at an entrance of the hollow cylindrical frame or housing to receive and guide the floating aquatic cage inside the device.

23. The device of claim 21, in which the guide element forms a continuous ramp, that inclines from the entrance opening toward the exit opening.

24. The device of claim 21, in which the guide element remains stationary relative to the hollow frame or housing when it imparts its turning force.

25. A device for rotation of a floating aquatic cage, comprising:
   a hollow cylindrical frame or housing defining a path through which the floating aquatic cage may pass, including entrance and exit openings;
   a guide assembly affixed to the entrance of the hollow cylindrical frame or housing to receive and guide the floating aquatic cage inside the device;
   a spiral path formed in a sidewall of the hollow cylindrical frame or housing and through which a tether line attached to the floating aquatic cage may pass;
   a plurality of helical guide elements positioned on an inside surface of the hollow cylindrical frame or housing and dimensioned to form an obstruction to opposing corners of the floating aquatic cage, and to impart a helical turning force in such a manner as to rotate the floating aquatic cage along a length of the hollow cylindrical frame or housing from the entrance opening to the exit opening; and
   a boat mounting system, wherein the boat mounting system comprises: a plurality of boat mounting brackets, each including a height adjustable sleeve portion; and an equal number of mounting posts affixed to a surface of the hollow cylindrical frame, the mounting posts being dimensioned to receive the height adjustable sleeve portions of the boat mounting brackets and removably connect the boat mounting brackets to the hollow cylindrical frame.

26. The device of claim 25, further comprising receiving brackets for mounting to a gunwale of the boat, the receiving brackets being dimensioned to receive and affix the boat mounting brackets to the boat.

27. The device of claim 25, in which the mounting posts form part of the hollow cylindrical frame or housing and wherein the height adjustable sleeve portions of the boat mounting brackets include a plurality of holes formed along the vertical axis thereof, and wherein a corresponding set of holes are formed along the vertical axis of the mounting posts, the holes providing a height adjustable mechanism for raising or lowering the height of the device on a boat and connecting the device to the boat with bolts or other fastener.

28. The device of claim 26, wherein the receiving brackets are adjustable horizontally and wherein the boat mounting brackets include a substantially horizontal portion with a plurality of holes, and wherein a corresponding set of holes are formed in the receiving brackets, the holes providing a horizontally adjustable mechanism for connecting the device to the boat with bolts or other fastener.

29. The device of claim 26, in which the boat mounting brackets form a pivotal connection with the receiving brackets and wherein the device pivots on a pivot axis defined by the pivotal connection, between a deployed position and a stowed position.

30. The device of claim 25, in which the boat mounting system comprises a boat cushion connected to one or more of the plurality of boat mounting brackets and wherein the boat cushion is connected to the boat mounting bracket by a pivotal connection.

* * * * *